United States Patent [19]

Reidy

[11] Patent Number: 5,106,512

[45] Date of Patent: Apr. 21, 1992

[54] PORTABLE AIR-WATER GENERATOR

[76] Inventor: James J. Reidy, 1260 Main St., Holden, Mass. 01520

[21] Appl. No.: 745,932

[22] Filed: Aug. 16, 1991

Related U.S. Application Data

[63] Continuation-in-part of Ser. No. 648,541, Jan. 30, 1991.

[51] Int. Cl.$^5$ .......................... C02F 1/00; B01D 5/00; F25D 17/06
[52] U.S. Cl. ........................................ 210/744; 55/20; 55/21; 55/23; 55/80; 55/97; 55/213; 55/215; 55/217; 55/269; 55/279; 55/472; 62/93; 62/272; 210/128; 210/251; 210/806
[58] Field of Search ................... 55/20, 21, 23, 80, 97, 55/213, 215, 217, 267, 269, 279, 322, 472; 62/93, 272; 210/104, 128, 137, 149, 251, 258, 741, 742, 744, 806

[56] References Cited

U.S. PATENT DOCUMENTS

| | | | |
|---|---|---|---|
| 4,146,372 | 3/1979 | Groth et al. | 55/80 X |
| 4,252,003 | 2/1981 | Eckard et al. | 62/93 X |
| 4,319,461 | 3/1982 | Shaw | 62/93 |
| 4,351,651 | 9/1982 | Courveya | 55/267 X |
| 4,505,128 | 3/1985 | Miller | 62/272 |
| 4,735,054 | 4/1988 | Beckey | 62/93 |

Primary Examiner—Charles Hart
Attorney, Agent, or Firm—Iandiorio & Dingman

[57] ABSTRACT

A water generating device for obtaining potable water from ambient air inside or outside a structure or dwelling, having ducts for bringing this supply of ambient air to the device and for releasing the air back outside the device after it has been processed. There is an air filter for filtering the air prior to processing of the air. The air filter includes a one-time sensing element which renders it unusable when removed from the generator. A condenser is provided for extracting water vapor in the air brought thereto by the ducts. Within the ducts there is a fan or blower to move air from outside the device through the condenser and for returning the air back outside the device after it has traversed the condenser. Between the condenser and the collection point, there is an immediate temporary holding reservoir, or plumbing to this reservoir, which contains an ultraviolet light to kill existing microorganisms, as well as a pump to transport the water through a subsequent water filter, a second exposure to ultraviolet light, and into the ultimate internal or external water storage unit. The water filter also includes a one-time sensing element which renders it unusable when removed. An internal container is positioned to receive and collect the water after it leaves the second exposure to ultraviolet light, and there is a water sensor below the top of the internal container for shutting down the device when the container is full of water. Prior to this internal container, which is removable and may be reusable, is a valve for diverting this water instead to external water storage units. A switch is provided for automatically deactivating the device until the nonreusable air filter element is replaced after a predetermined pressure drop in the air after the air filter compared to that of the air before the air filter. A timer is provided for deactivating the device until a nonreusable water filter element is replaced after a predetermined number of hours of operation. A sensor is provided for deactivating the device when the UV light(s) fail to operate. A thermostat and humidistat are settable in conjunction with each other by a user to minimize energy consumption and maximize water yield. There is also a manual override switch to these conditional settings. First, second, and third indicators provide a signal when the air filter element, the water filter element, and the UV light element(s) are in need of being replaced. A fourth indicator provides a signal when the internal water container is full.

17 Claims, 5 Drawing Sheets

PORTABLE AIR-WATER GENERATOR

RELATED APPLICATION

This application is a continuation-in-part of application Ser. No. 07/648,541, filed on Jan. 30, 1991.

FIELD OF INVENTION

The present invention relates to water making apparatus, and, more particularly, to such a device which makes potable water from the air.

BACKGROUND OF INVENTION

In recent years, it is becoming more usual for people in both offices and in the home to drink bottled water rather than the water from a water tap. Countless other situations exist where water is difficult to obtain or where available water or water quality leaves much to be desired. In many cases this also creates a need to carry and lift heavy bottles of water periodically and to carry the water from the place where it was purchased to the place where it will be used. Accordingly, there have been some attempts to provide water generating devices to alleviate these problems.

U.S. Pat. No. 1,931,347 to Gay issued Oct. 17, 1933, prepares potable water from a supply of water which is first frozen, to remove impurities. It does not treat water without first freezing it.

U.S. Pat. No. 2,409,624 to Granville issued Oct. 22, 1946, is a complicated system for providing water. It is manually powered and uses the "sulfuric acid system".

U.S. Pat. No. 3,035,418 to Wright issued May 22, 1962, provides water from air, but is lacking in many of the features needed to produce potable water for modern day uses. There is no safety provision allowing only properly operable filters to be used, and no provision to allow water production only when certain temperature/humidity conditions can be met.

U.S. Pat. No. 3,575,009 to Kooney issued Apr. 13, 1971, provides rapidly operating water vapor condensing means for use with a laundry clothes dryer. It uses ice as coolant and uses a filtering material designed to remove only lint from the resulting condensed water. The condensed water vapor is claimed to be suitable for use in steam irons or for any "other" purpose requiring water. There are no provisions for obtaining water of any confident purity level from the ambient air. Also, it has no air filter, has only a coarse water filter, no operational controls except the manually supplied ice filled chill unit, and it can only work during the time that a clothes dryer is operating.

U.S. Pat. No. 3,675,442 to Swanson issued July 11, 1972, discloses an apparatus for recovering potable water from "humid" air. It is thus not designed to operate at varying humidity levels, and fresh water is used as a coolant with water pumps. It has no air or water filters and no refined controls. It diverts condensed water vapor to the cool water bath as needed, and only the overflow is channeled to another container and is called potable. Swanson does not use a fan or blower to move air through his unit.

U.S. Pat. No. 4,182,132 to Nasser et al. issued Jan. 8, 1980, is designed to operate in hot and humid regions only; its primary purpose is to cool and dehumidify ambient air in relatively large areas such as a city neighborhood. There is no provision for protecting the purity of the water. It must be taller than the tallest building in the area, requires a foundation recessed in the ground, cannot be in any enclosing structure and must be in an open area free of ground contours, needs at least two air passages, and a heat dissipator in a passageway separate from the passageway containing the air cooler and moisture condenser. It relies on the specific gravity of cold air sinking within the device and hot air rising within the device. It has no air or water filters to protect the water.

U.S. Pat. No. 4,255,937 to Erlich issued Mar. 17, 1981, provides no operational controls for humidity, temperature, or filter conditions. The device also does not use a blower or fan.

U.S. Pat. No. 4,433,552 to Smith issued Feb. 28, 1984, does not mention potable water, has no air or water filters, requires a turbine, a generator, and wind. It has to be large (for example, it may be mounted on a trailer), it cannot be used indoors, there is no provision for protection of the water quality, and no filters for keeping insects, dust, etc. out of the water.

U.S. Pat. No. 4,892,570 to Littrell issued Jan. 9, 1990, is for agricultural water, and it only operates outdoors, is very large, designed for only high temperature regions, requires a wind of at least 5 mph to operate, is made of stone and cinder blocks, and has no refined controls or filters.

SUMMARY OF THE INVENTION

The present invention provides a potable water generator designed to produce potable water using existing technologies and known devices in a unique combination that safely extracts potable water from the ambient air in a wide range of user definable temperature and humidity conditions.

This invention provides a fine functional air filter to remove impurities from the air, safely, because the potable water generator is arranged to assure that only fresh and properly functioning air filters are used. User neglect or abuse is avoided, thereby contributing to safe, pure water. This unit will not work with a malfunctioning air filter.

This invention provides a fine functional water filter to remove impurities, odors, and objectionable taste, as well as other contaminants, safely, because the generator is permanently programmed by a time meter to assure that only fresh and properly functioning water filters are used and replaced on a regular, timely basis. Each time a water filter is replaced, the timer is automatically reset to zero. User neglect or abuse is avoided, thereby further contributing to safe, pure water. This unit will not work with a water filter exceeding the time meter limits.

Concerning the air filters, these are replaced or cleaned when needed based upon the pressure drop sensed by a pressure differential indicator. When the pressure drop reaches a predetermined amount, the generator ceases operation until the air filter is replaced or cleaned to assure that only fresh and properly functioning, energy efficient, air filters are used and replaced or cleaned on a regular, timely basis. User neglect or abuse is avoided, thereby further contributing to safe, pure water. This unit will not work with an air filter exceeding the pressure differential limits.

The frames of both filters contain a cooperating female sensor, which cooperates with a male pin on an electric switch that deactivates the operation of the entire unit. When either filter is removed for required replacement this original cooperating female sensor is destroyed and/or made irreparable. Only new, clean, and safe filters having such sensing structure can be used.

A time meter for the water filter and a pressure differential device for the air filter, as applicable, are programmed to deactivate the entire unit until the filter or filters required to be replaced or cleaned are in fact replaced or cleaned. The sensing device will confirm that the appropriate replacement filter or filters have been properly reinstalled and the generator will operate once again. The time span, or filter life, is determined by the particular model, its intended use and location—such as residential, industrial, commercial, construction, marine, recreational, military, and the like.

Safety and water purity is further enhanced by exposing the condensed water vapor to ultraviolet light on at least two occasions before this water is available to the user. On each single occasion over 99.99% of all bacteria, virus, and algae exposed to this ultraviolet light will be killed. The first exposure to ultraviolet light is accomplished as close to the newly condensed water vapor as possible - either in the initial catch basin or drip pan, or in plumbing to, or inside the immediate sump-pump temporary holding reservoir. The second exposure to ultraviolet light is accomplished after the water filter and immediately before the condensed water vapor exits the device into the removable water container or exterior storage devices as chosen by the user. This second exposure to ultraviolet light will also kill at least 99.99% of all algae, virus, or bacteria that may have reached this point. This double exposure to ultraviolet light can be done with two individual ultraviolet lights or by plumbing the water past one ultraviolet light twice.

A pump is used to enable the passage of the water through a fine water filter and to aid in transporting the water to subsequent locations within the device and/or to exterior storage units.

For those users sensitive to, or conscientious of, energy consumption, the generator includes temperature and humidity gauges as well as a thermostat and humidistat. These devices are intended to be used as follows:

The temperature and humidity gauges will aid the experienced user, as well as the novice in conjunction with a quick reference chart provided with the unit, in determining whether or not they want to operate the unit under present conditions for the likely water yield at that time.

The thermostat and humidistat settings as determined by the user, will allow unattended operation and preclude the need for any user monitoring whatsoever. The user may choose settings that provide only maximum water yield for energy consumed, or those settings that produce water regardless of energy consumed, or the user may choose one of the infinite settings between these two extremes.

It is expected that needs and priorities within an individual's environment are not static and that the flexibility afforded by these items maximizes the functionality and efficiency of the generator.

A custom designed reusable water condensate container is also an integral safety feature of the generator. It is conceivable that human nature or dire need may prompt the reuse of any container not designed for such purpose and may therefore be unsanitary and even dangerous. All containers in all models of the generator are designed to allow easy and proper cleaning by internal access through a wide neck. In addition, all larger containers will have an optional spigot. Those containers without spigots will transport more safely than those having spigots.

Other objects, features, and advantages will be apparent from the following detailed description of preferred embodiments taken in conjunction with the accompanying drawings in which:

DETAILED DESCRIPTION OF THE PREFERRED EMBODIMENTS

Figure 1:
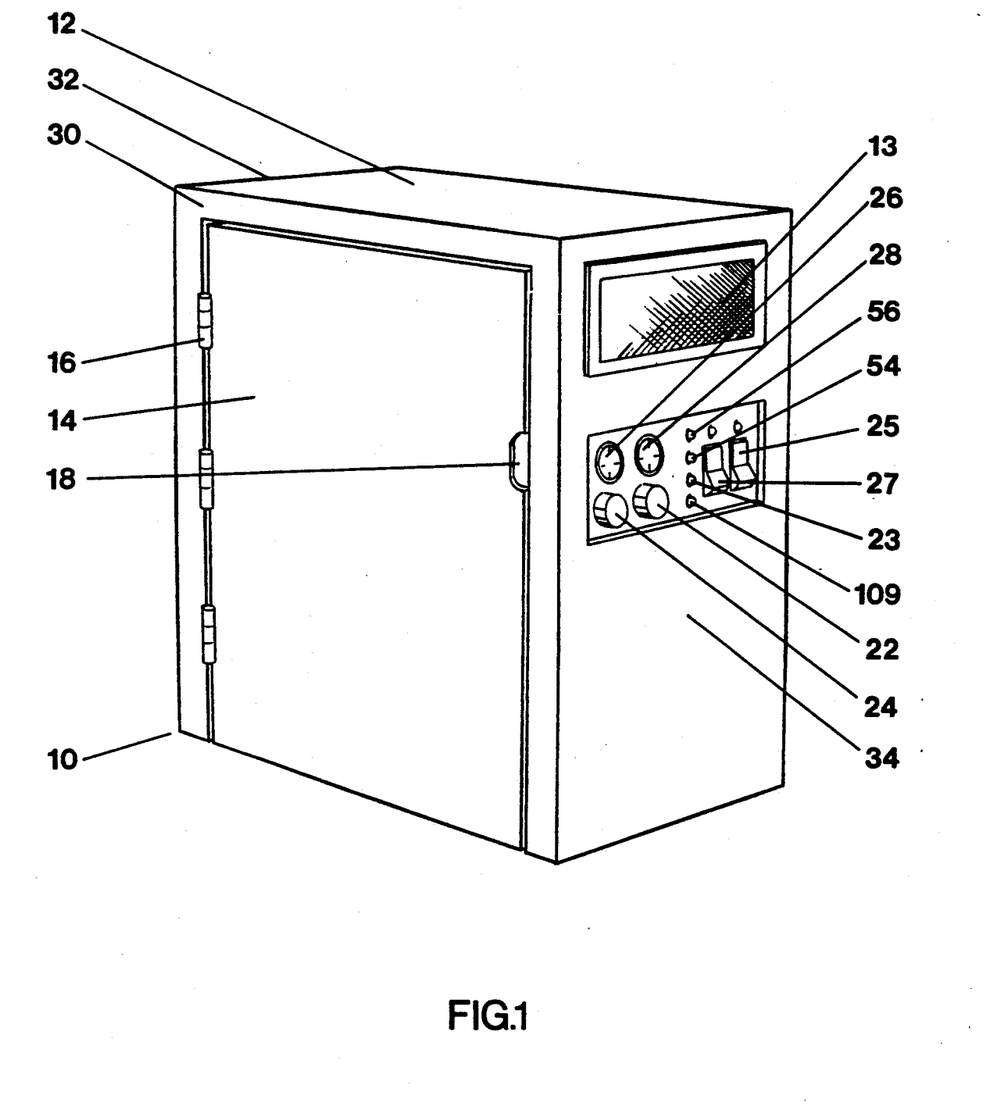
FIG. 1 is a schematic front view of the invention.

The basic device 10 as shown in FIG. 1 is enclosed in a cabinet 12 which houses the entire apparatus except for certain ductwork on some models which needs to be external of the device as explained below. The cabinet 12 has an insect screen 13, a side door 14 which is hinged at 16 and has a handle 18 with which this door can be opened to provide access to the inside of the device including the water filter element, air filter, UV lights, and the water container and/or temporary reservoir as well as all other serviceable parts.

Figure 5:
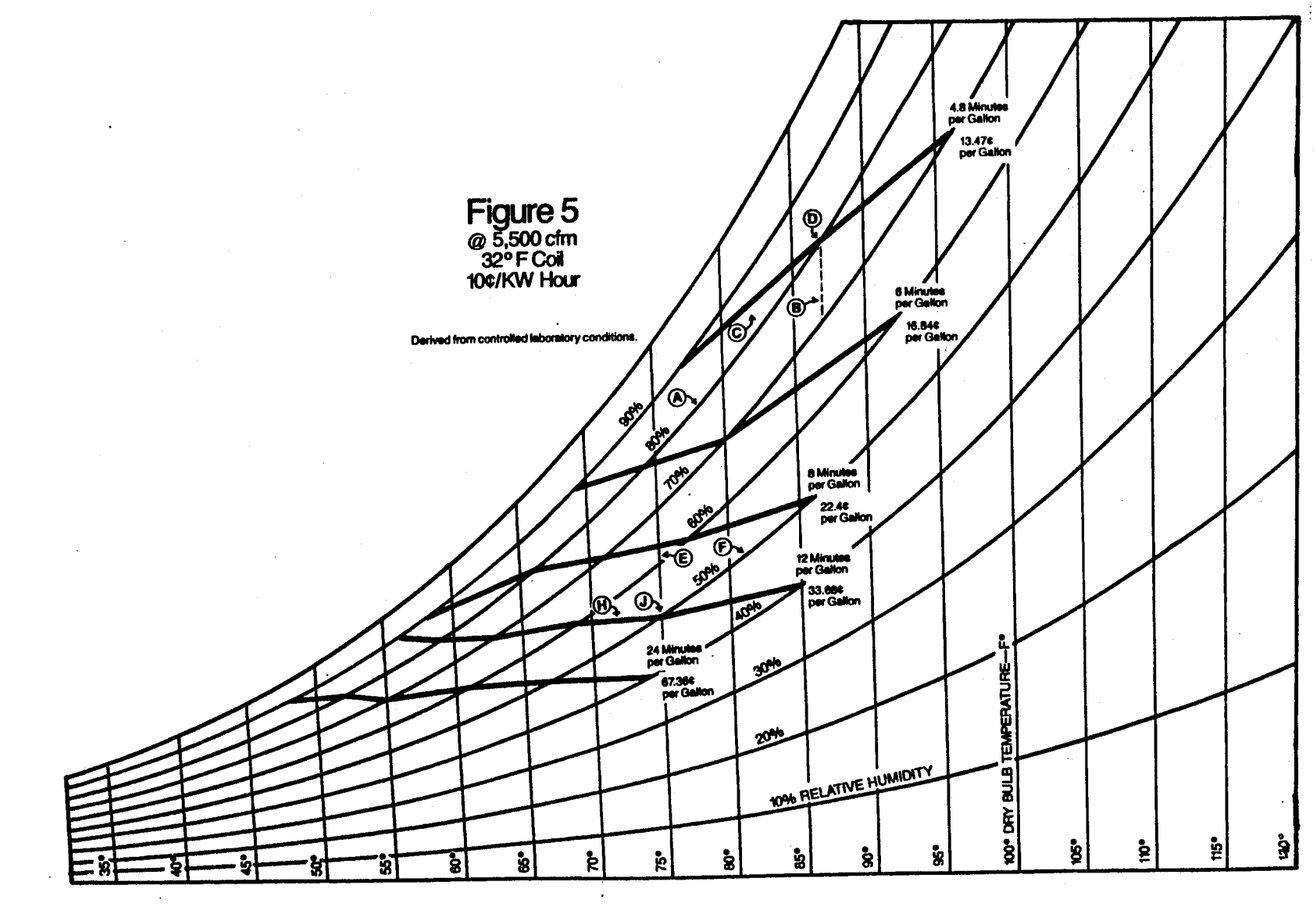
FIG. 5 is a chart of temperature and humidity on a scale which includes the approximate time and cost of producing a gallon of water.

There are two settable switches 22 and 24 which are a thermostat 22 to measure the temperature and open or close when a predetermined temperature is attained, and a humidistat 24 to measure the humidity and open or close when a predetermined humidity is attained. Complementing the switches there are two gauges 26 and 28 which are temperature and humidity gauges, respectively, for user-optional manual on/off operations, and which are an aid to determine the immediate water yields in conjunction with a simplified quick reference chart supplied with this device. (A more complex chart is shown in FIG. 5.) Switch 25 is the master ON/OFF switch that allows settable switches 22 and 24 to automatically activate or deactivate the basic device 10. Switch 27, when used, is a manual switch, and will override the conditional settings of switches 22 and 24.

Figure 2:
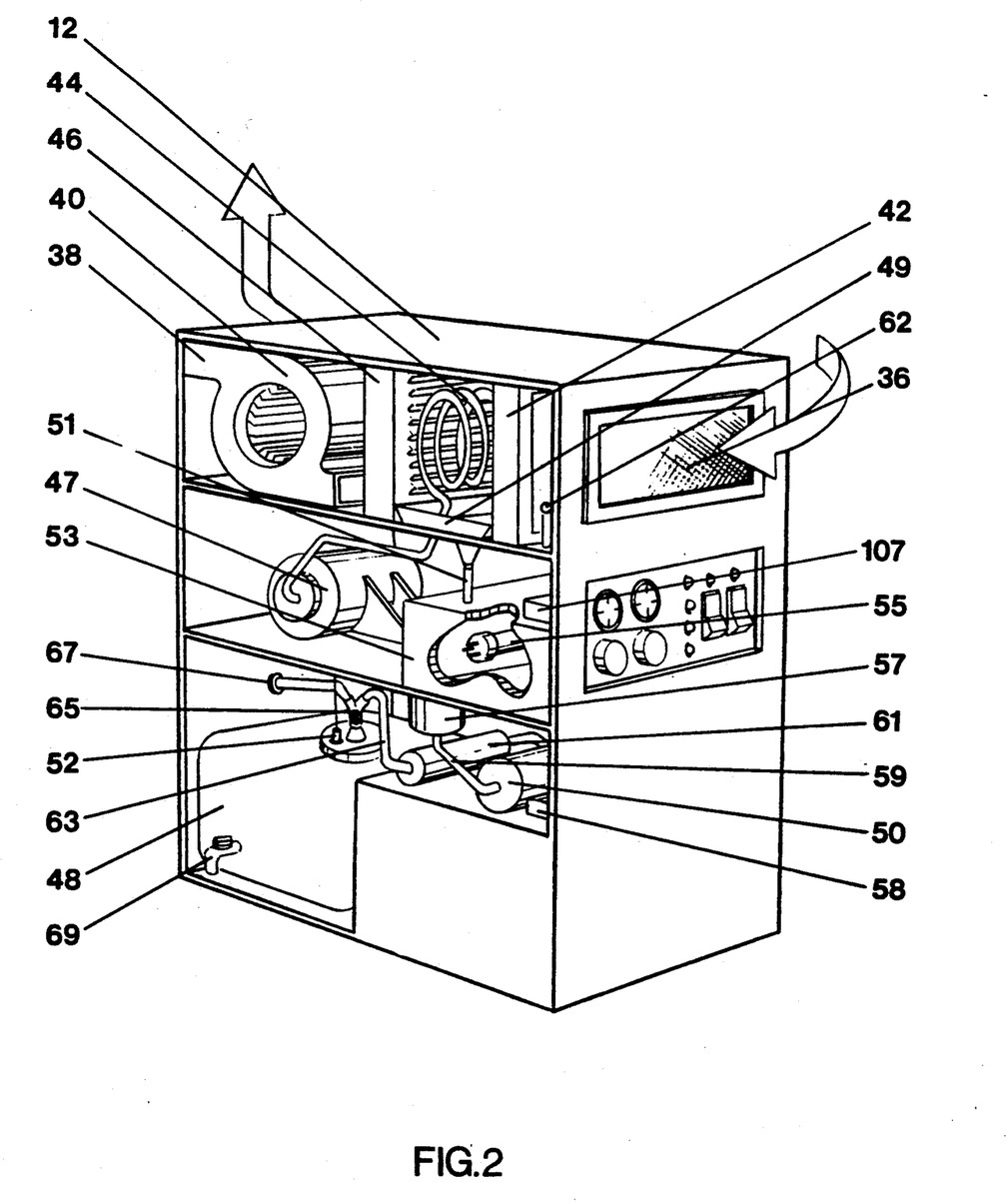
FIG. 2 is an isometric view of the device with parts broken away for clarity.

More details of the device are visible in FIG. 2, in which portions of the cabinet 12 walls have been broken away for clarity. The cabinet 12 has a side wall 30, a rear wall 32, and front wall 34. An inlet duct 36 and an outlet duct 38 are provided to direct ambient air through the device by means of the ductwork inside the cabinet. This ductwork can be located through an outside wall in some models. In addition to the model illustrated herein, which can vary in size, there can also be countertop models which fit into the kitchen cabinetry and which may have side venting arrangements. Still more variations can be constructed to fit recreational vehicles, mobile homes, and boats of all sizes. There is a fan or blower 40 which assists in bringing ambient air into the device. The air first passes through an air filter element 42 and then through the evaporator coils 44 of condenser coils 46, aided by compressor 47 to cool the air sufficiently to remove water vapor by condensation.

There is a cooperating female sensor that blocks orifice 86 (FIG. 3) when removed and is not reusable. This feature, for example, can be made of plastic and is described in more detail below.

The water condensate falls onto a collection pan 49 which immediately diverts this water into tube or piping 51 which empties into a temporary holding reservoir 53, which contains an ultraviolet light 55 to kill 99.99% of any existing microorganisms. This UV light could also be positioned in a coiled arrangement of piping 51. This temporary holding reservoir 53 could be positioned to replace the collection pan 49. When the water level in reservoir 53 reaches a specific level, pump 57 will force this water through tubing or piping 59, continuing through water filter 50, piping 59, and past a second ultraviolet light 61. This second ultraviolet light will kill 99.99% of any surviving microorganisms that may have reached this point. The machine would shut down if either light failed to operate properly. It is also possible with a different piping arrangement to pass the water by ultraviolet light 55 a second time, thereby eliminating the need for two individual ultraviolet lights. The water will continue travelling from ultraviolet light 61 into piping arrangement 63 which includes a diverting valve 65 to direct the water into either the removable internal container 48, or through common fitting 67 which would be used to connect to other exterior containers or tanks. The removable container 48 can be designed to be reusable, safely, by having a wide neck opening for easy cleaning. It can also have an optional spigot 69. There is also a sensor device 52 that is positioned inside the container and below the top, for shutting the machine down when the container 48 is full, to prevent overflowing.

A light 54 (FIG. 1) will turn on or flash whenever the water filter is in need of being changed or cleaned. There is another light 56 (FIG. 1) which will turn on whenever the air filter is in need of being changed. A third light 23 (FIG. 1) will indicate that the internal, removable reservoir is full, and a fourth 109 (FIG. 1) will indicate if one of the ultraviolet light(s) is out. A separate time meter 58 may be set to deactivate the unit until the non-reusable water filter is replaced after a predetermined number of hours of operation. A second separate sensor device 62 may be used which deactivates the unit until the non-resuable air filter is replaced or a reusable air filter is cleaned after a predetermined pressure drop from one side of the air filter to the other, and which increases with time. Thus, the air filter can be arranged with a device 62 for measuring the air pressure both upstream and downstream of the air filter and when the differential reaches a predetermined point, the device will shut down until the air filter is replaced or cleaned. This is based upon the air flow downstream decreasing as the filter becomes more filled with filtered material, causing the machine to become less efficient. Device 62 thereby prevents needless waste of energy. A light sensor, or lighting drive voltage or current sensor 107, and a similar sensor for light 61 (part 109, FIG. 1) will indicate when a light has burned out, and may be enabled to automatically stop the unit from operating as a safety measure.

Figure 3:
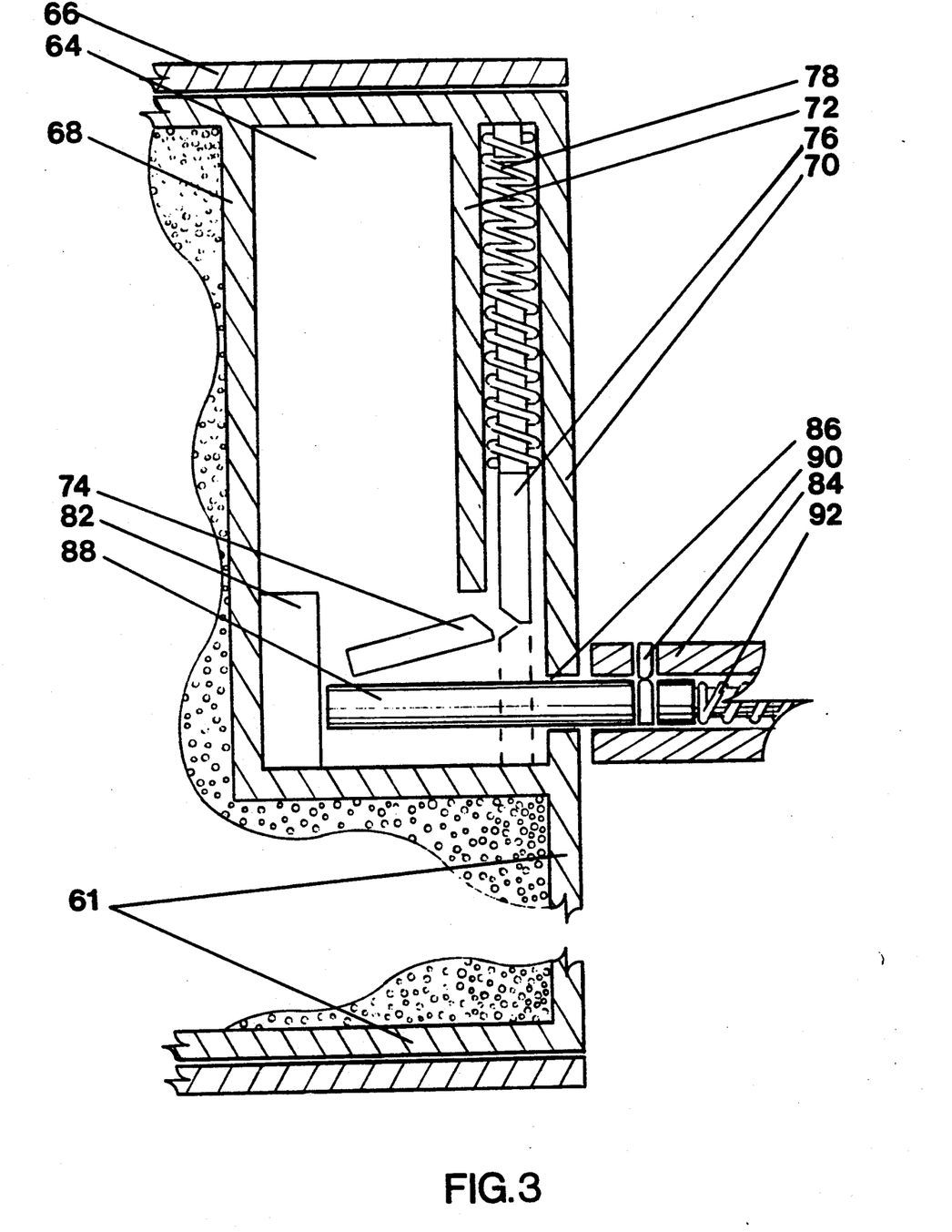
FIG. 3 is a plan view of the cooperating female sensor which is integrated into the filter frames to confirm that the proper filter is in place, and allow only one-time use when the filter is not intended to be reusable.

As shown in FIG. 3 in plan view, the filter 42 or 50 is held in a frame or housing. Each frame may have a one-time use cooperating female sensor 64 built into it. This sensor may be modified by eliminating trap door 74/76 and compression spring 78 to allow repeated use of a reusable, cleanable air filter. It will continue to sense that the proper, reusable air filter is in place. This female sensor 64 is positioned in a special place within the air filter frame or water filter housing 61, which in turn is held in position by guiding channels 66. The female sensor 64 is provided with a basic chassis 68 having a back wall 70, and a retaining wall 72 spaced slightly therefrom and providing sufficient space for holding a "trap door" arrangement including two pieces 74 and 76 weakly connected together along line 80 (FIG. 4), and located in the space between the back wall 70 and the retaining wall 72. The trap door 74, 76 is biased downwardly by compression spring 78.

Figure 4:
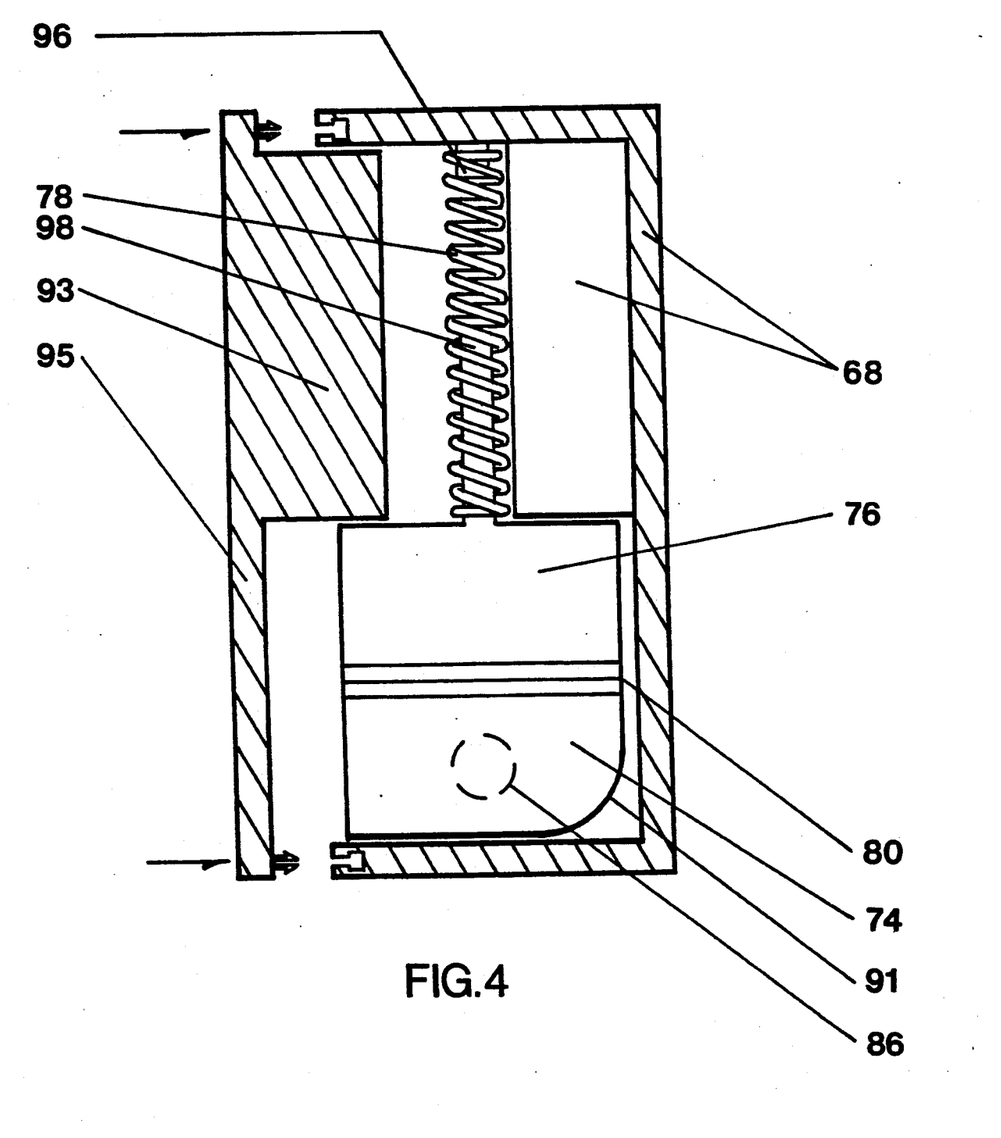
FIG. 4 is a front view of the cooperating female sensor illustrated in FIG. 3.

The female sensor 64 has a stop block 82 on the wall opposite the one containing the trap door opening 86. There is a frame 84 on the generator which slidably holds a pin 88 which is biased toward the filter by compression spring 92. There is an electrical switch contact 90 which is closed when the off/on/off travel of pin 88 is in a certain location within the switch frame 84 held in precise horizontal position by spring 92 holding it against stop block 82. The trap door has a lower part 74 which breaks away when pin 88 is inserted into chassis 68 through opening 86, and an upper part 76 which is held in its original position by pin 88 until the filter with attached female sensor 64 is removed. Then, compression spring 78 forces part 76 down and holds it there, sealing opening 86, preventing further use of this filter. The primary intent, then, of this female sensor 64 is to prevent the user from reusing an expended water filter or air filter once it is removed from the machine or to confirm that the proper reusable air filter is in place. Device 62 (FIG. 2) senses when the air filter becomes inefficient and shuts the machine off until only a new or cleaned air filter is reinstalled. Device 58 (FIG. 2) determines by a specific time period when the water filter should be removed and replaced with a new water filter, and prevents further operation of the machine until this is done. Because female sensor 64 prevents the reuse of either expended filter it thereby assures only safe and energy efficient use of this machine.

In some cases it may be desirable to have an air filter that can be cleaned and reused. In these instances a different air filter, such as an electrostatic filter, intended for repeated use can be used and female sensor 64 would lack compression spring 78 and trap door 74/76. Stop block 82 would then work in conjunction with opening 86 and pin 88 to confirm that only the proper air filter is in place. Energy conservation would still be monitored by device 62.

FIG. 4 shows the one-time use cooperating female sensor from the front. The sensor basic chassis 68 is shown as is the compressed spring 78. There may be a nipple 96 or other guiding parts which holds the spring 78 when it is uncompressed in position during assembly, and the nipple is attached to the chassis. There is another longer nipple 98 attached to part 76 at the bottom end of the spring 78 which holds this spring while it is being compressed by the insertion of the trap door. There is a top piece 95 (shown in FIG. 4 as a side view) which permanently seals the entire chassis. The final assembly piece 95 of the entire device, is shown partially inserted. There is a retaining block 93 which is also part of assembly piece 95 and aids in holding the upper part of the trap door in position while open or closed, including spring 78. The interior of the trap door is "chiselled" to create a weak breaking point. The bottom end of the trap door has a modified corner 91 to allow insertion of the trap door while compressing the spring 78 from an angled starting position.

When the filter is entered into its correct position the pin or male sensor 88 which projects out of its switch frame 84 engages the trap door through an opening 86 in the rear wall 70. The unit will only operate when pin 88 is in its precise, but only partially extended, off/on/-off travel position as precisely determined by block 82. Also, upon pressing of the filter into place, the trap door breaks and the shorter part 74 falls over onto the bottom and upper part 76 slides down due to pressure from compression spring 78 and remains resting upon the top of the pin 88. When it is time to remove the filter, it is removed and the compression spring 78 forces part 76 downward until it reaches the bottom, and it thereafter remains in this position. It is impossible to place this same filter into this same location because the outwardly extending pin 88 will not go beyond wall 70, as it will be blocked by the trap door upper part 76. Thus, the filter cannot be reused. When the filter is first placed into position, the pin 88 breaks the trap door, and the lower part of it, which is at first in a vertical position as shown in dashed lines, moves into and through the solid line position of the part and it then falls down horizontally where it thereafter remains.

FIG. 5 provides a chart showing various ambient conditions and has added thereto the approximate number of minutes to produce one gallon of water at the temperature and relative humidity conditions indicated for a specific coil temperature and rate of air flow. Also, the approximate cost of energy to make a gallon of water is calculated at an assumed cost of 10¢/KWH. Thus, if the humidistat was set for 80% relative humidity, which is the curve designated A in FIG. 5, and the thermostat was set for 87° F.(which is the vertical line designated B), the device would produce a gallon of water in 4.8 minutes and at a cost of less than 13.5¢/gallon as shown on line C at point D in FIG. 5. A second example in FIG. 5 shows vertical line E indicating a thermostat setting at 75° F. and curved line F indicating a humidistat relative humidity setting of 50%, which results in the production of a gallon of water in approximately 12 minutes as designated on line H at point J at an approximate cost of 34¢ per gallon. The settings of the humidistat and thermostat assure that the device will operate only when the ambient air is within the conditions set and at a cost and time period acceptable to the user.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A water generating device for obtaining potable water from ambient air, comprising:
   air passage means for bringing a supply of inside or outside ambient air to the device and for returning the air back outside the device after it has been processed;
   air filtering means for filtering the air prior to processing of the air;
   condenser means for extracting water vapor in the air brought thereto by the duct means;
   first ultraviolet light means for killing microorganisms in the extracted water;
   a temporary holding reservoir for holding the freshly extracted water;
   pump means to move the water from the temporary holding reservoir to subsequent locations within the device, or to exterior water storage units;
   water filter means downstream of said pump means for filtering the water;
   second ultraviolet light means for killing microorganisms in the filtered water;
   container means positioned to receive and collect water after it leaves the water filter means; and
   said air filter means and said water filter means each including a filter element having means for permitting use of the filter element only one time so that the filter element is not reusable when it is removed.

2. A water generating device as defined in claim 1, further including blower means inside the duct means to move air from outside the device through the condenser means and for returning the air back outside the device after it has traversed the condenser means.

3. A water generating device as defined in claim 2, in which said filter one-time use means includes a plunger on the device and a scored flat element which is broken when the filter element is inserted into place, so that when the filter element is removed, the top portion of said flat element moves downward and prevents reinsertion of said filter due to the plunger hitting the flat element.

4. A water generating device as defined in claim 3, in which the plunger closes a contact when a new filter is inserted and completes a circuit which permits the device to operate.

5. A water generating device as defined in claim 1, further including a water sensor below the top of said container means for shutting down the device when the container means is full of water.

6. A water generating device as defined in claim 1, further including a water sensor below the top of said container means for activating a pump when the container means is full of water to move the water to another location.

7. A water generating device as defined in claim 1, further including a pressure sensitive differential switch for deactivating the device until a nonreusable air filter element is replaced after a predetermined drop in air pressure.

8. A water generating device as defined in claim 1, further including a time meter for deactivating the device until a nonreusable water filter element is replaced after a predetermined number of hours of operation.

9. A water generating device as defined in claim 1, further including thermostat means and humidistat means which are settable in conjunction with each other by a user to minimize energy consumption and maximize water yield.

10. A water generating device as defined in claim 1, further including a thermometer and humidity indicator for manual use of the device.

11. A water generating device as defined in claim 1, further including first, second and third indicator means for providing a signal when the air filter element, the water filter element, and an ultraviolet light, respectively, are in need of being replaced.

12. A water generating device as defined in claim 1 further including means for exposing the water to ultraviolet light a second time downstream of said water filter means to kill additional microorganisms.

13. A water generating device as defined in claim 12 in which said means for exposing includes a second ultraviolet light.

14. A water generating device as defined in claim 12 in which said means for exposing includes means for running the pumped water past said ultraviolet light means.

15. A water generating device as defined in claim 1 in which said ultraviolet light means is in said temporary holding reservoir, or in plumbing to the holding reservoir.

16. A water generating device for obtaining potable water from ambient air inside a structure or dwelling or ambient air outside a structure or dwelling, comprising:

air passage means for bringing a supply of inside or outside ambient air to the device and for returning the air back outside the device after it has been processed;

air filter means for filtering the air prior to processing of the air, said filter means including a cooperating female sensor which renders the air filter useless when removed;

condenser means for extracting water vapor in the air brought thereto by the air passage means;

blower means inside the air passage means to move air from outside the device through the condenser means and for returning the air back outside the device after it has traversed the condenser means;

first ultraviolet light means for killing microorganisms in the just extracted water vapor;

temporary holding reservoir means or plumbing means to this reservoir for containing said first ultraviolet light means and freshly extracted water vapor;

pump means to move the water from the temporary holding reservoir to subsequent locations within the device, or to exterior water storage units;

water filter means downstream of said pump means for filtering the water, said water filter means including a cooperating female sensor which renders the water filter non-reusable when removed;

second ultraviolet light exposure means to kill remaining microorganisms just prior to the water being deposited into its internal or external container;

container means positioned to receive and collect the water after it is exposed to the second ultraviolet light means;

water sensor means below the top of said container means for shutting down the device when the container means is full of water or for activating a pump;

means for measuring the pressure differential across the air filter for deactivating the device after a predetermined pressure drop in operation until this nonreusable air filter element is replaced;

timing means for deactivating the device after a predetermined number of hours of operation until the nonreusable water filter element is replaced;

thermostat means and humidistat means which are settable in conjunction with each other by a user to minimize energy consumption and maximize water yield;

thermometer and humidity indicators for providing a visual measure of the temperature and relative humidity of the air passing through the device; and first, second, and third indicator means for providing a signal when the air filter element, the water filter element, or an ultraviolet light means, respectively, are in need of being replaced.

17. A water generating method for obtaining potable water from ambient air that is inside or outside a structure or dwelling comprising:

bringing a supply of inside or outside ambient air to a first station and releasing the air after it has been processed;

filtering the air through a filtering element prior to processing of the air, said air filter element becoming useless when removed;

extracting water vapor in the air brought to the first station;

moving air from outside the device through the first station and returning the air back outside the first station;

exposing the extracted water vapor immediately to ultraviolet light;

pumping the water to subsequent locations within the device, or to exterior water storage units;

filtering the water from the extracting step through a filtering element which becomes useless when removed;

exposing the filtered water to ultraviolet light a second time;

collecting the water at a collecting station after the second ultraviolet light exposure;

sensing the water level at the collecting station below the top of the collecting station for shutting down the process or activating a pump when the collecting station is full of water;

deactivating the device when the air filter element is to be replaced and until this nonreusable air filter element is replaced after a preselected pressure drop;

deactivating the device when the water filter element is to be replaced and until this nonreusable water filter element is replaced after a predetermined operating time;

deactivating the device when at least one ultraviolet light is to be replaced and until an operable ultraviolet light is in place and operating;

detecting the temperature and the relative humidity of the air brought to the first station and using this information in accordance with predetermined conditions to initiate and cease the process to minimize energy consumption and maximize water yield according to parameters chosen by the user; and providing a signal and deactivating the unit when the air filter element or the water filter or an ultraviolet light element are in need of being replaced.

* * * * *

UNITED STATES PATENT AND TRADEMARK OFFICE
CERTIFICATE OF CORRECTION

PATENT NO. : 5,106,512
DATED : April 21, 1992
INVENTOR(S) : James J. Reidy It is certified that error appears in the above-identified patent and that said Letters Patent is hereby corrected as shown below:

On the Title page, item [54] and in Col. 1, the Title should read --Potable Air-Water Generator--.

Signed and Sealed this

Twenty-first Day of September, 1993

Attest:

BRUCE LEHMAN

*Attesting Officer*   *Commissioner of Patents and Trademarks*